(12) United States Patent
Petiton et al.

(10) Patent No.: US 10,343,443 B2
(45) Date of Patent: Jul. 9, 2019

(54) OPTICAL SECURITY COMPONENT WITH REFLECTIVE EFFECT, PRODUCTION OF SUCH A COMPONENT AND SECURE DOCUMENT PROVIDED WITH SUCH A COMPONENT

(71) Applicant: SURYS, Bussy Saint Georges (FR)

(72) Inventors: Valéry Petiton, Vendrest (FR); Vincent Tollet, Bouleurs (FR)

(73) Assignee: SURYS, Bussy Saint Georges (FR)

( * ) Notice: Subject to any disclaimer, the term of this patent is extended or adjusted under 35 U.S.C. 154(b) by 0 days.

(21) Appl. No.: 15/968,332

(22) Filed: May 1, 2018

(65) Prior Publication Data
US 2018/0244099 A1    Aug. 30, 2018

Related U.S. Application Data

(63) Continuation of application No. 15/302,547, filed as application No. PCT/EP2015/055165 on Mar. 12, 2015, now Pat. No. 9,987,873.

(30) Foreign Application Priority Data

Apr. 7, 2014 (FR) .................................. 14 53077
Apr. 8, 2014 (FR) .................................. 14 53127

(51) Int. Cl.
*B42D 25/324* (2014.01)
*B42D 25/328* (2014.01)
(Continued)

(52) U.S. Cl.
CPC ........... *B42D 25/29* (2014.10); *B42D 25/324* (2014.10); *B42D 25/328* (2014.10);
(Continued)

(58) Field of Classification Search
CPC ............................. B42D 25/324; B42D 25/328
See application file for complete search history.

(56) References Cited

U.S. PATENT DOCUMENTS

| 4,856,857 A | 8/1989 | Takeuchi et al. |
| 6,600,603 B1 * | 7/2003 | Sambles ................... F41H 3/00 283/91 |

(Continued)

FOREIGN PATENT DOCUMENTS

| DE | 102010047250 A1 | 6/2011 |
| FR | 2509873 A1 | 1/1983 |

(Continued)

OTHER PUBLICATIONS

International Search Report issued in corresponding application No. PCT/EP2015/055165 dated Aug. 27, 2015 (6 pages).
(Continued)

*Primary Examiner* — Kyle R Grabowski
(74) *Attorney, Agent, or Firm* — Osha Liang LLP

(57) ABSTRACT

According to one aspect, the invention relates to an optical security component intended for being observed under direct reflection. The component comprises a structure engraved on a layer of a material having a refraction index $n_2$, a thin layer of a dielectric material having a refraction index $n_1$ other than $n_2$, deposited on the structure, and a layer of a material having a refraction index no other than $n_1$, encapsulating the coated structure of the thin layer. The structure has a first pattern modulated by a second pattern such that, in at least one first region (61, 86), the first pattern comprises a low-relief with a first set of facets, the shapes of which are determined such as to generate at least one first concave or convex cylindrical reflective element, and the second pattern forms a first subwavelength grating acting, after depositing the thin layer and encapsulating the structure, as a first wavelength-subtractive filter; in at least one second region
(Continued)

(62, 86), the first pattern comprises a low-relief with a second set of facets in which the shapes are determined such as to generate at least one concave or convex cylindrical reflective element (64), and the second pattern forms a second subwavelength grating acting, after depositing the thin layer and encapsulating the structure, as a second wavelength-subtractive filter, separate from the first wavelength-subtractive filter. Each subwavelength grating can be a zero order diffraction grating such as a DID.

15 Claims, 9 Drawing Sheets

(51) Int. Cl.
  *B42D 25/29* (2014.01)
  *G02B 5/18* (2006.01)
  *B42D 25/425* (2014.01)
  *B42D 25/355* (2014.01)
(52) U.S. Cl.
  CPC ......... *B42D 25/355* (2014.10); *B42D 25/425* (2014.10); *G02B 5/1809* (2013.01)

(56) References Cited

U.S. PATENT DOCUMENTS

| | | | |
|---|---|---|---|
| 7,002,746 B2 | 2/2006 | Schilling et al. | |
| 7,102,823 B2 | 9/2006 | Schilling et al. | |
| 7,604,855 B2 * | 10/2009 | Raksha | B42D 25/00 283/72 |
| 2005/0106367 A1 | 5/2005 | Raksha et al. | |
| 2008/0259456 A1 * | 10/2008 | Schilling | B42D 25/324 359/571 |
| 2010/0307705 A1 * | 12/2010 | Rahm | B42D 25/29 162/140 |
| 2012/0319395 A1 | 12/2012 | Fuhse et al. | |
| 2014/0037898 A1 * | 2/2014 | Tompkin | B42D 25/324 428/141 |
| 2014/0160568 A1 * | 6/2014 | Fuhse | B42D 25/00 359/586 |
| 2015/0192897 A1 * | 7/2015 | Schilling | B42D 25/351 359/2 |
| 2016/0023495 A1 * | 1/2016 | Fuhse | B42D 25/328 359/566 |

FOREIGN PATENT DOCUMENTS

| | | | | |
|---|---|---|---|---|
| WO | 03/084766 A2 | 10/2003 | | |
| WO | 2011/136394 A1 | 11/2011 | | |
| WO | 2012055537 A2 | 5/2012 | | |
| WO | WO-2012055537 A2 * | 5/2012 | ............ | B42D 25/00 |
| WO | 2014001283 A1 | 1/2014 | | |
| WO | WO-2014001283 A1 * | 1/2014 | ............ | B42D 25/36 |

OTHER PUBLICATIONS

Written Opinion of the International Searching Authority issued in corresponding application No. PCT/EP2015/055165 dated Aug. 27, 2015 (6 pages).
Rudolf L. van Renesse: "Optical Document Security (Third Edition)", 2005, Artech House, Boston / London, XP002734127, ISBN: 1-58053-258-6 pp. 212-217.

* cited by examiner

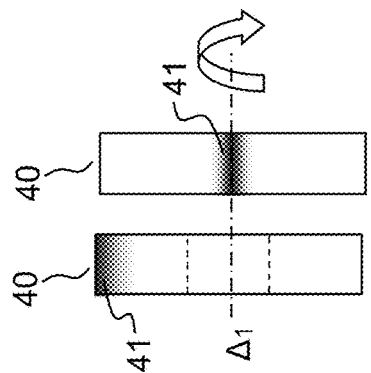
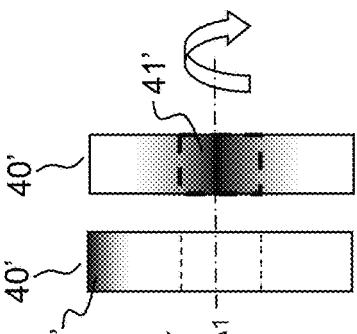
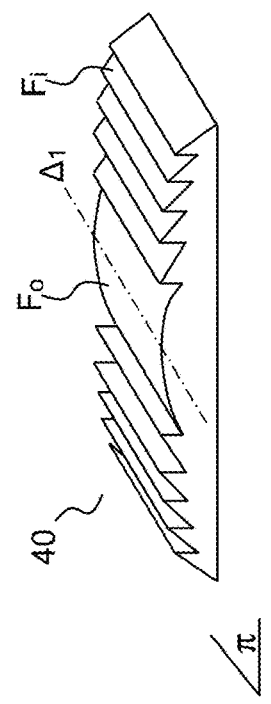
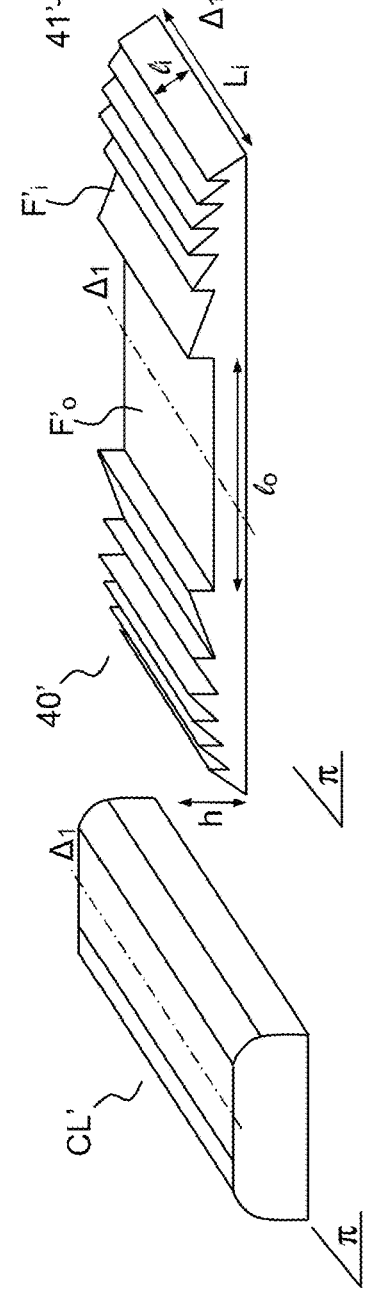
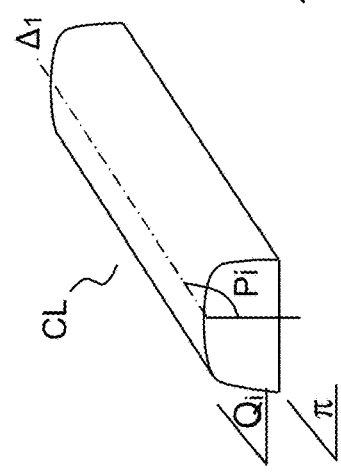

OPTICAL SECURITY COMPONENT WITH REFLECTIVE EFFECT, PRODUCTION OF SUCH A COMPONENT AND SECURE DOCUMENT PROVIDED WITH SUCH A COMPONENT

CROSS-REFERENCE TO RELATED APPLICATIONS

This application is a continuation of application Ser. No. 15/302,547, which is the National Stage of International Application No. PCT/EP2015/055165, filed Mar. 12, 2015.

TECHNICAL FIELD

The present description relates to the field of security marking. More particularly, it pertains to an optical security component with reflective effect for verifying the authenticity of a document, to a method for manufacturing such a component and to a secure document equipped with such a document.

PRIOR ART

Numerous technologies are known for the authentication of documents or products, and notably for the securing of documents such as documents of value like banknotes, passports or other identification documents. These technologies are aimed at the production of optical security components whose optical effects as a function of the observation parameters (orientation with respect to the observation axis, position and dimensions of the light source, etc.) assume very characteristic and verifiable configurations. The general aim of these optical components is to provide new and differentiated optical effects, on the basis of physical configurations that are difficult to reproduce.

Among these components, optical components that produce diffractive and variable images that are commonly called holograms are called DOVID for "Diffractive Optical Variable Image Device". These components are generally observed in reflection. Among these components, some exhibit optical effects observable at zero order that is to say in direct reflection, allowing simpler authentication by a public that is not initiated to the optics of gratings. Such is the case for example for "DID" components, the abbreviation standing for the expression "Diffractive Identification Device", described for example in application FR 2509873 and which act as wavelength-subtractive filters.

It is known to generate an additional effect consisting of a dynamic variation of an optical effect, for example in the form of displacement in a given direction of a bright and/or colored zone, sometimes called a "rolling bar", the displacement resulting from a variation of the component angle of tilt. An observer can then observe a bright and/or colored zone which moves along an image when he rotates the component, thereby constituting an additional authentication check.

Thus for example, in the published application US 20050106367, there is described a procedure for securing banknotes by means of magnetic "flakes" oriented according to a variable angle by means of a magnet so as to form dynamic optical effects. More precisely, as is illustrated in FIGS. 1A and 1B, the flakes 101 can be oriented in a convex manner in a first region ($R_1$) and in a concave manner in a second region ($R_2$). The resulting optical effect when the component is illuminated by a fixed illumination source, is a pair of bright bars (102, FIG. 1B), each of the bars giving the impression of moving in opposite directions (symbolized by arrows in FIG. 1B) when the component undergoes a tiltwise rotation.

Dynamic optical effects such as these exhibiting "rolling bars" are also described in U.S. Pat. No. 7,002,746 and published patent application US 20120319395. In these documents, macrostructures are described that comprise facets oriented according to a given angle so as to create reflection effects making it possible to generate a visual effect of displacement of a bright bar when the component undergoes a tiltwise rotation. FIG. 2 thus presents an exemplary embodiment with as previously a double rolling bar effect (202), obtained by orienting the facets differently in complementary regions (231, 232, 233).

In these documents, it is described according to variants how it is moreover possible by means of particular overlays, for example interferential layers, to generate a tiltwise variable colored effect, in addition to the dynamic effect.

The present invention presents an optical security component exhibiting dynamic optical effects of "double rolling bar" type, whose authentication is strengthened by virtue of intense and azimuthwise variable colored effects, coupled with the dynamic optical effects.

SUMMARY

According to a first aspect, the invention relates to an optical security component intended to be observed according to an observation face in a spectral band lying between 380 and 780 nm and in direct reflection, comprising:
  a structure engraved on a layer of a material exhibiting a refractive index $n_2$,
  a thin layer of a dielectric material exhibiting a refractive index $n_1$ different from $n_2$, deposited on the structure;
  a layer of a material of refractive index no different from $n_1$, encapsulating the structure overlaid with the thin layer,
  the structure exhibiting a first pattern modulated by a second pattern in such a way that:
    in at least one first region, the first pattern comprises a bas-relief with a first set of facets whose shapes are determined so as to generate at least one first cylindrical reflective element, concave or convex seen from the observation face, exhibiting a first principal direction, and the second pattern forms a first sub wavelength grating acting, after deposition of the thin layer and encapsulation of the structure, as a first wavelength-subtractive filter;
    in at least one second region, the first pattern comprises a bas-relief with a second set of facets whose shapes are determined so as to generate at least one second cylindrical reflective element, concave or convex seen from the observation face, exhibiting a second principal direction, and the second pattern forms a second sub wavelength grating acting, after deposition of the thin layer and encapsulation of the structure, as a second wavelength-subtractive filter, different from the first wavelength-subtractive filter.

Such an optical security component exhibits a dynamic visual effect of "running bright bands" when it undergoes a tiltwise rotation about an axis parallel to one of the first and second principal directions which is all the more marked as each of the first and second reflective elements thus formed exhibits a different "color" due to the sub wavelength grating which modulates it.

In the present description, an element exhibiting at least one portion of a cylinder whose generator defines a principal direction of the element is called a cylindrical reflective element.

According to one or more embodiments, the cylindrical reflective element thus formed, be it concave or convex, exhibits a symmetry with respect to a longitudinal axis parallel to the principal direction; according to another embodiment, the cylindrical reflective element can consist only of a first half of a symmetric reflective element such as this, and will be referred to as a "cylindrical reflective half-element".

According to one or more embodiments, the first and second sub wavelength gratings are defined from the projections on each of the first and second sets of facets of two, unidimensional, plane gratings arranged in a plane parallel to the plane of the component and characterized respectively by first and second grating vectors of perpendicular directions, the direction of one of the grating vectors being parallel to one of the first and second principal directions.

This configuration makes it possible to obtain for each of the first and second reflective elements two very intense complementary "colors" during observation of the tiltwise dynamic effect of the component, the two colors moreover reversing when the optical security component undergoes an azimuthal rotation of 90°, thus offering an additional means of authentication.

According to one or more embodiments, the norm of the grating vector whose direction is parallel to one of the first or second principal directions is variable in such a way that the grating projected on the corresponding set of the facets is of substantially constant spacing. With a constant spacing of the grating whatever the inclination of the facets, a stable color is obtained on each of the cylindrical reflective elements.

According to one or more embodiments, the first and second sets of facets form sets of plane surfaces, for example of rectangular shape, oriented along respectively the first and second principal directions, and inclined with respect to the plane of the component in a continuously variable manner to respectively first and second substantially plane central facets.

The presence of a plane central facet of given width in a direction perpendicular to the principal direction makes it possible to widen to a greater or lesser extent the bright band that is seen when the plane of the component is oriented in the plane of visibility of the specular reflection, thereby making it possible to prompt the person in charge of checking to spontaneously "adjust" the component so as to have the largest possible active surface area. Advantageously this angle of "adjustment" is favorable to the observation of other security elements present on the document and also visible in direct reflection.

The width of the central facet is at least equal to 5% of the length of the corresponding reflective element, measured in the same direction.

In the case of a cylindrical reflective element exhibiting a longitudinal axis parallel to the principal direction, said axis is centered on the central facet.

In the case of a "half cylindrical reflective element", the central facet can form an end of the corresponding set of facets.

According to one or more embodiments, in a third region situated in proximity to the central facets of the first and second sets of facets, the first pattern of the structure is formed of a plane surface parallel to the first and second central facets and the second pattern forms one or more sub wavelength gratings acting, after deposition of the thin layer and encapsulation of the structure, as one or more wavelength-subtractive filters. According to an embodiment, the sub wavelength grating(s) form one or more recognizable pattern(s). According to an embodiment, 2 sub-wavelength gratings are involved, arranged at 90° and forming complementary patterns.

This configuration exhibits a noteworthy visual effect for an observer, since the color(s) visible in the third region in reflection at zero order appear in an intense manner when the person in charge of checking has "adjusted" the component tiltwise in such a way that the bright band appears for each of the first and second cylindrical reflective elements at the level of the central facet.

Thus for example, in the case of cylindrical reflective elements that are symmetric with respect to a longitudinal axis, it is when the bright band is centered on the longitudinal axis that the color(s) will appear in the third region, advantageously in the form of a recognizable pattern which "lights up".

If the two cylindrical reflective elements exhibit perpendicular principal directions, the tiltwise "adjustment" of the component to obtain the appearance of color(s) in the third region can be done in relation to two axes.

According to another example, in the case of an arrangement of a plurality of cylindrical reflective half-elements, a plane central face of which forms an end, it is possible to arrange these cylindrical reflective half-elements in such a way that the plane central facets of each of the sets of facets are grouped together at the level of the third region thus forming a "central plateau". The tiltwise "adjustment" of the optical security component can then be done, for example in the case where all the cylindrical reflective half-elements are concave, by making the set of bright bands run toward the central plateau.

According to one or more embodiments, it is possible to create fictitious stages in the running of the bright bands by altering the variation of angle between 2 successive facets.

According to one or more embodiments of the optical security component according to the present description, the first and second principal directions can be parallel. Thus, the bright bands of the two cylindrical reflective elements run when the component is rotated tiltwise about one and the same axis.

In this case, there may be a concave cylindrical reflective element and a convex cylindrical reflective element, in such a way that an observer sees a "color" run in one direction while the other color runs in the opposite direction, allowing a particularly immediate authentication of the component.

Thus, in a particular exemplary embodiment of the optical component according to the present description, in the first region, the bas-relief comprises a set of facets whose shapes are determined so as to generate one or more concave cylindrical reflective elements arranged according to a first line, and, in the second region, the bas-relief comprises a set of facets whose shapes are determined so as to generate one or more convex cylindrical reflective elements arranged according to a second line parallel to the first line.

The optical security component can be applied to the securing of numerous products, identity documents or fiduciary products such as banknotes.

Thus, according to one or more embodiments, the optical security component according to the present description is suitable for securing a document or a product, and comprises on the face opposite to the observation face a layer for the transfer of the component onto the document or the product.

It furthermore comprises, on the observation face side, a support film intended to be detached after transfer of the component onto the document or the product.

According to one or more embodiments, the optical security component according to the present description is suitable for the manufacture of a security thread for the securing of banknotes, and comprises on the observation face side and on the face opposite to the observation face, protection layers or films.

According to one or the other of the embodiments, the component can furthermore comprise on the side opposite to the observation face, a colored contrast layer, advantageously an opaque colored contrast layer.

According to a second aspect, the present description relates to a banknote comprising at least one first optical security component such as described previously, said first optical security component forming a security thread partially inserted into a support of the banknote.

According to one or more embodiments, the banknote furthermore comprises a second optical security component positioned on a face of the banknote and forming two wavelength-subtractive filters similar to the first and second wavelength-subtractive filters of the first optical security component.

According to a third aspect, the present description relates to a method for manufacturing an optical security component according to the first aspect.

Thus, the invention relates to a method for manufacturing an optical security component intended to be observed in a spectral band lying between 380 and 780 nm and in direct reflection, the method comprising:
the deposition on a support film of a first layer of a material of refractive index $n_0$;
the formation on the first layer of at least one engraved structure,
the structure (S) exhibiting a first pattern modulated by a second pattern in such a way that:
in at least one first region, the first pattern comprises a bas-relief with a first set of facets whose shapes are determined so as to generate at least one first cylindrical reflective element, concave or convex seen from the observation face, exhibiting a first principal direction, and the second pattern forms a first sub wavelength grating acting, after deposition of a thin layer and encapsulation of the structure, as a first wavelength-subtractive filter;
in at least one second region, the first pattern comprises a bas-relief with a second set of facets whose shapes are determined so as to generate at least one second cylindrical reflective element, concave or convex seen from the observation face, exhibiting a second principal direction, and the second pattern forms a second sub wavelength grating acting, after deposition of the thin layer and encapsulation of the structure, as a second wavelength-subtractive filter, different from the first wavelength-subtractive filter;
the method furthermore comprising:
the deposition on the engraved structure of a thin layer of a dielectric material exhibiting a refractive index m different from $n_0$;
the encapsulation of the structure overlaid with the thin layer by a layer of a material exhibiting a refractive index $n_2$ different from $n_1$.

The component according to the present description is thus suitable for manufacture in large volumes according to methods used for the manufacture of components of holographic type.

According to the present description, the banknote described hereinabove can comprise:
the manufacture of a first optical security component in the manner described hereinabove,
the incorporation of the first optical security component into a support of the banknote, and
the fitting in place of the second optical security component on a face of said support.

BRIEF DESCRIPTION OF THE FIGURES

Other characteristics and advantages of the invention will become apparent on reading the description which follows, illustrated by the figures in which:

FIGS. 4A to 4F, diagrams illustrating the rolling bar effect by means of structure elements in examples of components according to the present description;

DETAILED DESCRIPTION

Figure 1A:
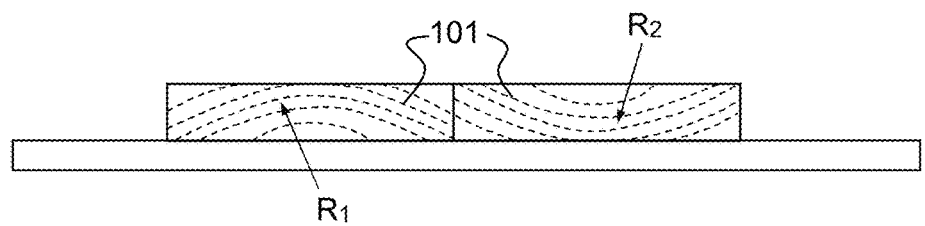
FIGS. 1A and 1B, already described, represent an example of double rolling bars according to the prior art.
Figure 1B:
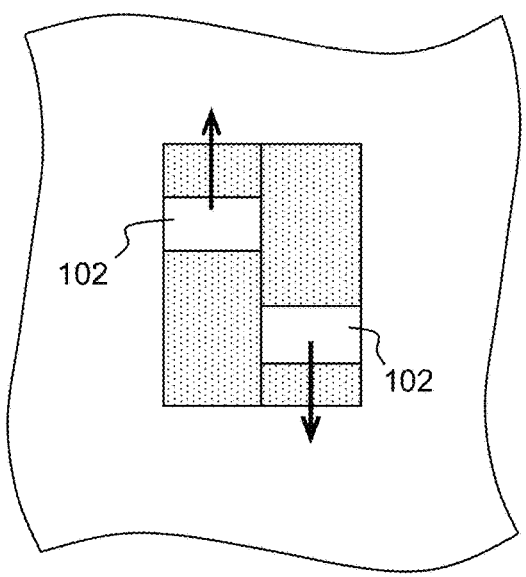
Figure 2:
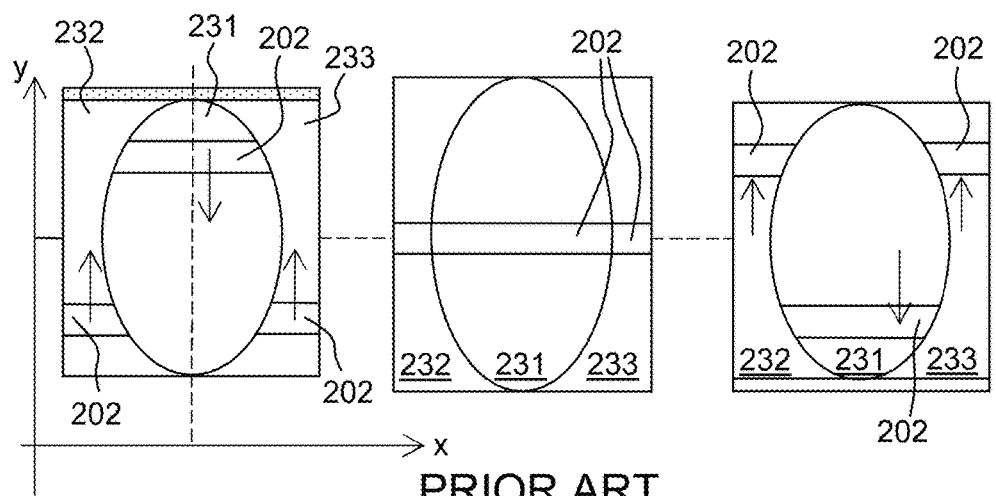
FIG. 2, already described, represents another example of double rolling bars according to the prior art.
Figure 3A:
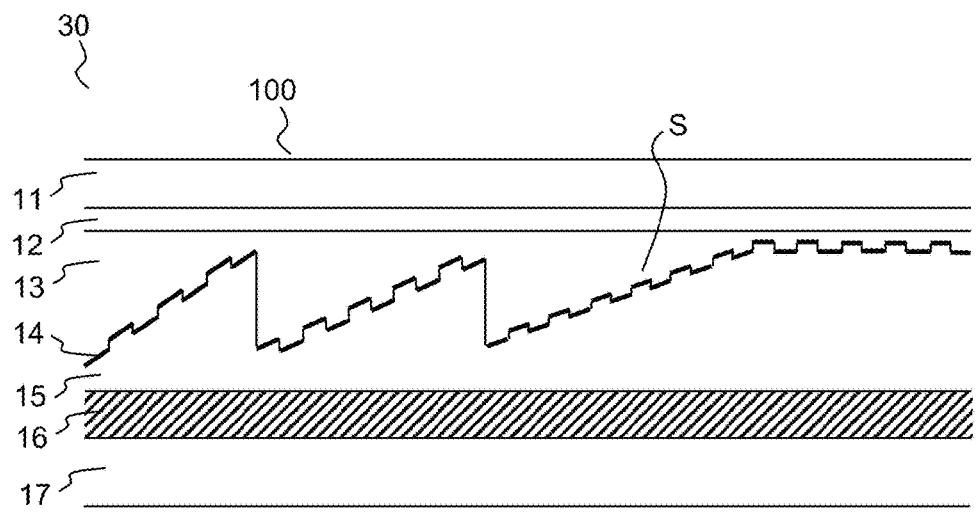
FIGS. 3A and 3B, sectional views of exemplary embodiments of components according to the present description.
Figure 3B:
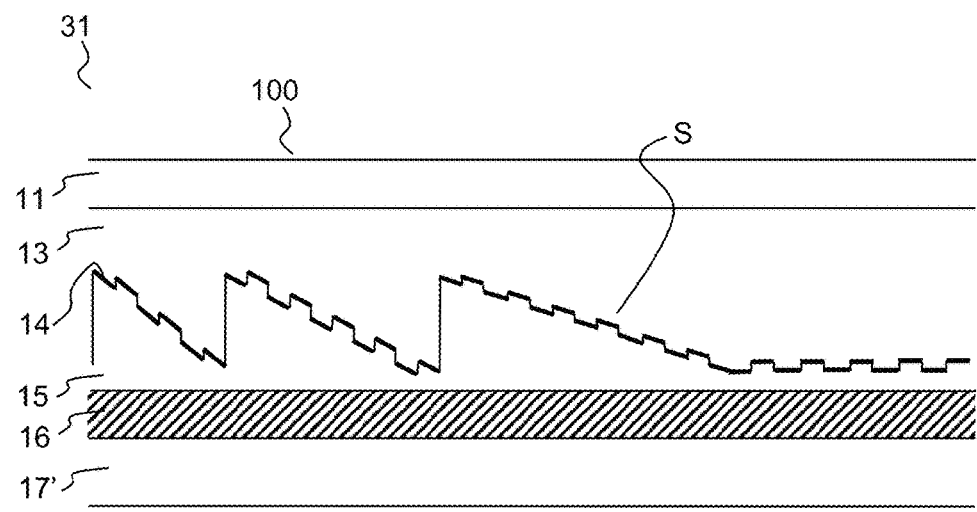

FIGS. 3A and 3B represent according to (partial) sectional views two examples of optical security components according to the present description.

The component 30 represented in FIG. 3A represents an exemplary optical security component intended to be transferred to a document or a product with a view to the securing thereof. It comprises according to an embodiment a support film 11, for example a film of polymer material, for example a polyethylene terephthalate (PET) film of a few tens of micrometers, typically 20 to 50 μm, as well as a detachment layer 12, for example of natural or synthetic wax. The detachment layer makes it possible to remove the polymer support film 11 after fixing the optical component on the product or document to be secured. The optical security component 30 moreover comprises a set of layers 13-15 for carrying out the optical function of the component and which will be described in greater detail subsequently, as well as an (optional) opaque colored contrast layer 16 and an adhesive layer 17, for example a hot-reactivatable adhesive layer, for fixing the optical security component on the product or document. Note that the contrast layer 16 can also be merged with the adhesive layer 17 or the layer, of the set of layers forming the optical function of the component that is furthest from the observation face 100 of the component (layer 15 in FIG. 3A). In practice, as will be detailed subsequently, the optical security component is manufactured by stacking the layers on the support film 11, and then the component is fixed, by virtue of the adhesive layer 17, on a document/product to be made secure. The support film 11 can then be detached, for example by means of the detachment layer 12.

FIG. 3B represents an optical security component 31 intended for the securing of banknotes; it entails for example a part of a security thread intended to be integrated into the paper during the manufacture of the banknote. In this example, as previously the component 31 comprises a support film 11 (12 to 25 µm), a set of layers 13-15 for carrying out the optical function of the security component, an (optional) opaque colored contrast layer 16 and a protection layer 17', for example a film or a varnish. As in the previous example, the manufacture can be carried out by stacking the layers on the support film 11. The protection layer 17' is deposited thereafter so as to give the security thread the necessary solidity.

The set of layers 13-15 comprises in the example of FIGS. 3A and 3B, a layer 15 of a material exhibiting a refractive index $n_2$, engraved with a structure S, a thin layer 14 of a dielectric material deposited on the structure S and exhibiting a refractive index m different from $n_2$, and a layer 13 of a material of refractive index no different from encapsulating the structure overlaid with the thin layer. By "different" refractive indices is meant a difference of at least 0.3 between the refractive indices, advantageously of at least 0.5. According to an embodiment, the thin layer is a layer of so-called "high index" (or "HRI" for "High Refractive Index") material, exhibiting a refractive index lying between 1.8 and 2.9, advantageously between 2.0 and 2.4 and the layers 13 and 15 on either side of the high-index layer are so-called "low-index" layers, exhibiting refractive indices lying between 1.3 and 1.8, advantageously between 1.4 and 1.7. The layer 13 arranged on the observation face side is transparent in the observation spectral band.

As is apparent in FIGS. 3A and 3B, the structure S exhibits a first pattern modulated by a second pattern. In a first region (visible in FIGS. 3A and 3B alone), the first pattern comprises a bas-relief with a first set of facets whose shapes are determined so as to generate at least one concave or convex reflective element when seen from the observation face 100 (convex element in the example of FIG. 3A and concave in the example of FIG. 3B), and the second pattern forms a first sub wavelength grating acting as a first wavelength-subtractive filter. In a second region (not visible in FIGS. 3A, 3B), the first pattern comprises a bas-relief with a second set of facets whose shapes are determined so as also to generate at least one concave or convex reflective element when seen from the observation face 100 and the second pattern forms a second sub wavelength grating acting as a second wavelength-subtractive filter, different from the first wavelength-subtractive filter, so as to obtain visual effects which will be described in greater detail subsequently.

The method for manufacturing optical security components according to the present description advantageously comprises the following steps.

The optical structure S formed of the first pattern modulated by the second pattern is recorded as will be detailed subsequently by electron beam photolithography or lithography on a photosensitive support (known as a "photoresist"). A galvanoplasty step makes it possible to transfer the optical structure into a resistant material for example based on Nickel so as to produce a metal matrix or "master" comprising the optical structure S intended to form the first pattern modulated by the second pattern. The manufacture of the optical security component then comprises the stamping of the layer 13 of dielectric material of refractive index no, for example a low-index layer, typically a stamping varnish a few microns thick. The layer 13 is advantageously carried by the support film 11, for example a 12 µm to 50 µm film made of polymer material, for example PET (polyethylene terephthalate). The stamping can be done by hot pressing of the dielectric material ("hot embossing") or by molding and then UV crosslinking ("UV casting"). Replication by UV crosslinking makes it possible notably to reproduce structures exhibiting a large amplitude of depth and makes it possible to obtain better faithfulness in the replication. Generally, any high-resolution replication procedure known from the prior art can be used in the replication step. This is followed thereafter by the deposition on the layer thus embossed of the layer 14 of refractive index $n_1$ different from no, for example by vacuum evaporation. The layer 14 is for example a high-index layer, for example Zinc Sulfide (ZnS), of refractive index 2.2, or titanium oxide (TiO$_2$), of refractive index 2.5 or high optical index polymer material and its thickness lies between 40 and 200 nm. Then comes the application of the layer 15 of refractive index $n_2$ different from $n_1$, for example a layer identical in nature to the layer 13 a few microns thick, and then the (optional) deposition of the opaque colored contrast layer 16 and ultimately the deposition of the layer of glue or varnish type (17, 17') by a coating method or a UV-crosslinkable varnish, for example.

The recording of the structure S for the design of the matrix advantageously comprises the following steps.

There is firstly undertaken a step of determining the structure S aimed at defining the first and second patterns.

In at least one first region and one second region, the first pattern of the structure comprises a bas-relief with respectively a first set of facets and a second set of facets whose shapes are determined so as to generate at least one concave or convex reflective element. For the determination of the shape of the first pattern, it is possible to refer to the procedure for forming Fresnel lenses, as is illustrated by means of FIGS. 4A to 4F in the case of a convex element.

The reflective element that it is sought to reproduce with the bas relief forming the first pattern is advantageously a cylindrical reflective element CL or CL' such as represented in FIGS. 4A and 4B, that is to say an element formed of a segment of cylinder whose generator defines a principal direction. In the examples of FIGS. 4A and 4D, the reflective elements represented (here convex) are moreover symmetric with respect to a longitudinal axis (denoted Ai) parallel to the principal direction of the cylinder. According to an embodiment, it can be a "cylindrical half-element", that is to say an element limited to the part extending from just one side of the longitudinal axis $\Delta_1$. Cylindrical reflective elements such as these make it possible in fact to reflect a pointlike or quasi-pointlike source as a bright line or "band", indicated respectively 41 and 41' in FIGS. 4C and 4F. Advantageously, as will be described in greater detail subsequently, the reflective element that it is sought to reproduce will be able to exhibit a "plateau", that is to say a plane region of greater or lesser width centered on the longitudinal axis. The effect of such a plateau is to be able to widen the bright band in reflection, as is visible in FIG. 4F (band 41').

FIGS. 4B and 4E show respectively the bas reliefs obtained from the reflective elements CL and CL' of FIGS.

4A and 4D. Each bas relief comprises a set of facets ($F_i$, $F'_i$) determined so as to generate the sought-after concave or convex reflective element. In the example of FIG. 4B where it is sought to obtain a slender reflection-wise bright band (referenced 41 FIG. 4C), the central facet $F_0$ centered on the longitudinal axis is substantially convex. In the example of FIG. 4E where it is sought to obtain a wide reflection-wise bright band (referenced 41' in FIG. 4E), the central facet $F'_0$ centered on the longitudinal axis is plane and its width $l_0$ in the direction perpendicular to the longitudinal axis of dimension suitable for the sought-after effect.

The determination of the shape of the facets to obtain the sought-after convex or concave reflective element can be done by known means, described for example in application WO2011138394 in the name of the applicant.

According to a first embodiment, it is possible for example to undertake a meshing of the reflective element (for example CL or CL') with constant spacing. It is possible to define a plane Π of support of the reflective element such as illustrated in FIGS. 4A to 4F. The meshing in the case of a reflective element exhibiting a longitudinal axis is advantageously done according to a set of elementary planes $P_i$ which are perpendicular to the plane Π and parallel to the longitudinal axis and equidistant. The shape of the first pattern can then be obtained by translating in each mesh cell the elementary surfaces of the reflective element so as to obtain a first pattern in the form of bas relief of reduced thickness whose facets reproduce the shape of the elementary surfaces.

According to a second embodiment, it is possible to determine the shape of the first pattern so as to limit the thickness of the first pattern to a predetermined value. The meshing is then performed at constant level in the form of a slicing, as is the case in the example of FIGS. 4B and 4E. In this case, the meshing of the reflective element makes it possible to adapt the thickness of the first pattern obtained by arranging a constant gap between meshing planes $Q_i$ parallel to one another and to the plane Π of support of the reflective element, and equidistant. The thickness of the first resulting pattern can thus be constant. As previously, the shape of the first pattern can be obtained by translating the elementary surfaces of the reflective element so as to obtain a first pattern in the form of bas relief of reduced thickness whose facets $F_i$, $F'_i$ reproduce the shape of the elementary surfaces. Such an embodiment is advantageous within the framework of a replication by embossing since it limits the thickness variations of the first resulting pattern.

Whether in the case of the first or second embodiments described hereinabove for determining the first pattern, it is possible to regard the facets as inclined planes. In this case, each facet does not necessarily reproduce the shape of the corresponding elementary surface of the reflective element but is formed of an inclined plane whose equation approximates as far as possible the corresponding elementary surface. The angle of inclination of the facets is continuously variable and decreases (in absolute value) from the facet situated at an end of the reflective element toward the central facet.

In practice, the height h of the facets of the first pattern is generally between 0.5 and 7 microns. Each facet Fi can be regarded as a rectangle and exhibits a large dimension $L_i$ and a small dimension $l_i$. The large dimension $L_i$ corresponds to the width of the cylindrical reflective element, measured in a direction parallel to the longitudinal axis and typically measuring from one to several millimeters ($L_i \geq 0.5$ mm). The small dimension $l_i$ measured on the facet in a direction perpendicular to the large dimension $L_i$ must be sufficiently large to be able to be modulated by a sufficient number of periods of the sub wavelength grating. Thus, typically, $l_i$ equals between 2 to 20 μm, preferentially between 4 to 10 μm. Thus, typically, a symmetric cylindrical reflective element according to the present description exhibits a total length of between 5 and 20 mm, for example around 10 mm and a width of a few millimeters. The central facet exhibits a width $l_0$ advantageously greater than 0.5% of the total length, i.e. typically a few fractions of millimeters, for example around 0.5 mm. On either side of the central facet there are from a few hundred to a few thousand facets so as to form the bas-relief making it possible to simulate the cylindrical reflective element.

According to the present description, each set of facets forming a concave or convex reflective element is moreover modulated by a second pattern, the second pattern forming a sub wavelength grating acting, after deposition of the thin layer and encapsulation of the structure, as a first wavelength-subtractive filter.

The principle of such a wavelength-subtractive filter is known and described for example in application FR 2509873. Such a component, called a DID according to the abbreviation of the expression "Diffractive Identification Device", behaves as a structured waveguide making it possible to excite resonances of guided modes at different wavelengths as a function of polarization. In reflection, such a component thus behaves as a bandpass filter, forming a colored mirror whose color varies with the direction of observation. Stated otherwise, an observer observing the component via the observation face 100 (FIGS. 3A, 3B) will see a colored effect of a first color according to a first orientation and a colored effect according to a second color according to a second orientation obtained by azimuthal rotation of the component. Each "first" and "second" color corresponds to a spectral band of interest lying between 380 nm and 780 nm, centered on a wavelength defined by the period and the depth of the sub wavelength grating, the thickness of the high-index layer and the difference in index between the high-index and low-index layers. Typically, the central wavelengths sought are around 500 nm and 630 nm, making it possible to generate respectively green and red colors in direct reflection. The period of the grating is chosen as a function of the central wavelength of interest, and lies between 100 and 600 nm, advantageously between 200 and 500 nm.

According to the present description, at least one first sub-wavelength grating modulating a first set of facets whose shapes are determined so as to form at least one convex or concave cylindrical reflective element and at least one second sub-wavelength grating modulating a second set of facets whose shapes are determined so as to form at least one convex or concave cylindrical reflective element are defined. Advantageously, the first and second sub wavelength gratings are defined from the projections on each of the first and second sets of facets of two, unidimensional, plane gratings arranged in a plane (Π) parallel to the plane of the component and characterized respectively by first and second grating vectors of perpendicular directions, the direction of one of the grating vectors being parallel to one of the first and second principal directions. It is recalled that the grating vector $k_g$ of a unidimensional grating exhibits a direction perpendicular to the direction of the lines of the grating and a norm inversely proportional to the period according to the expression $k_g = 2\pi/d$ where d is the period of the grating.

Figures 5A, 5B, 5C:
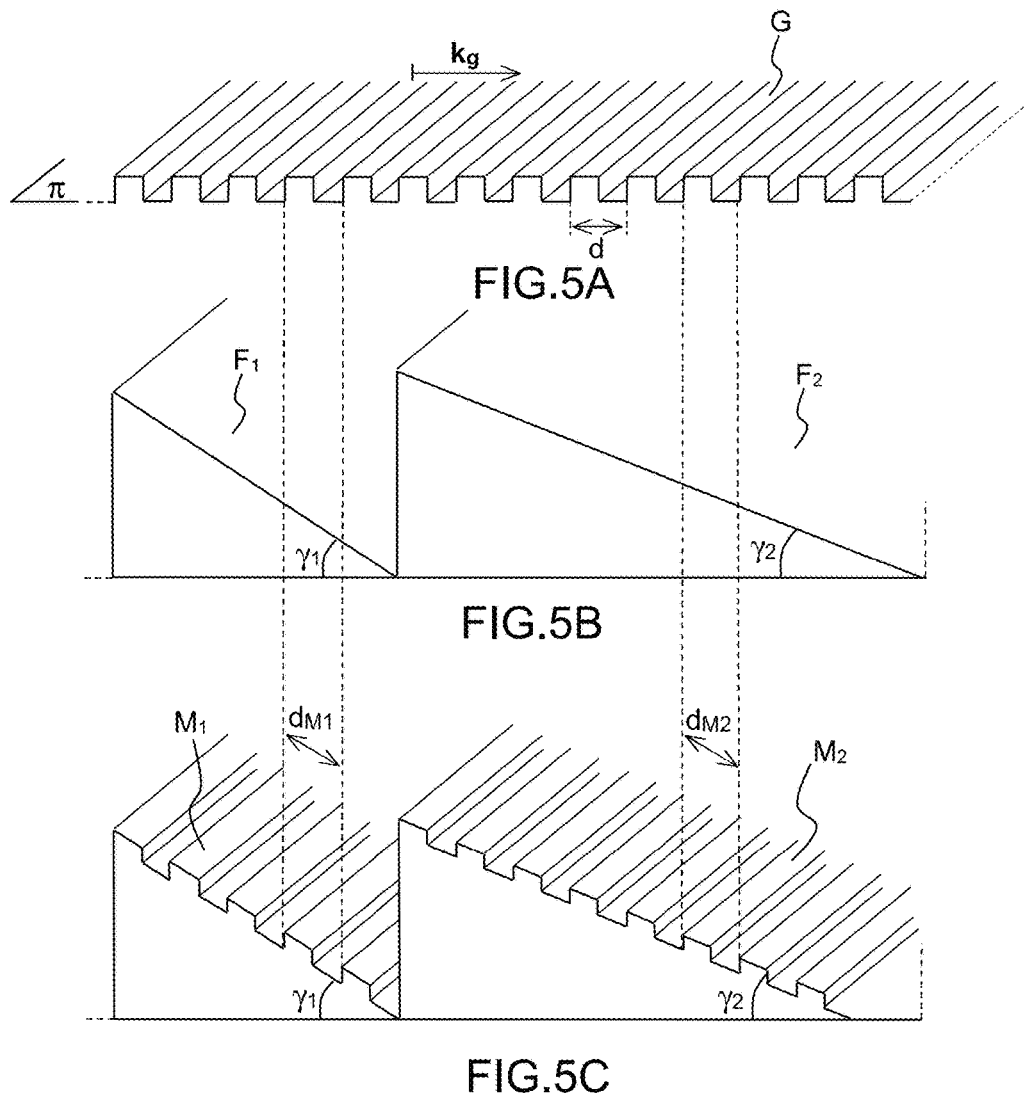
FIGS. 5A to 5C, diagrams illustrating according to an example the determination of the optical structure of a component according to the present description.

Thus FIGS. 5A to 5C illustrate the modulation of a first pattern comprising a set of facets $F_i$ such as defined previously (FIG. 5B) by a second pattern ("first grating") defined by projection of a sub wavelength grating referenced G (FIG. 5A) and defined in a plane Π parallel to the plane of the component (and parallel therefore to the observation face 100). As is illustrated in FIG. 5A, the grating G is characterized by a spacing d and a grating vector $k_g$. In FIG. 5C, the structure S resulting from the modulation of the first pattern comprising the set of the facets by the first grating, comprises a set of facets M, each supporting a unidimensional grating. Because of the concavity or convexity of the cylindrical reflective element that it is sought to generate via the first pattern, the facets $F_i$ each exhibit with respect to a plane Π parallel to the plane of the component an angle $\gamma_i$ which varies as a function of the position of the facet with respect to the central facet $F_0$. The projection on each facet $F_i$ of a grating G of constant spacing d and whose grating vector exhibits a direction perpendicular to the principal direction of the cylindrical element may result in a projected grating of variable spacing, referenced $d_{Mi}$ in FIG. 5C. When significant angles of inclination of the facets $F_i$ are attained, typically angles $\gamma_i$ greater than 15°, it may be beneficial to vary the spacing of the grating G before projection (FIG. 5A) so as not to generate any color variation in reflection as a function of the facet. On the other hand, there is no effect of the projection on a set of facets of a grating G whose grating vector exhibits a direction parallel to the principal direction of the cylindrical element. Thus when the first and second sub-wavelength gratings which modulate respectively the first and second sets of facets forming the concave and/or convex cylindrical reflective elements are determined, a corrector factor can advantageously be applied to the choice of the spacing of one of the gratings defined in the plane of the component, before projection.

In the above examples, the sub wavelength gratings are of square profile. It is obvious that the gratings can equally well exhibit a sinusoidal or quasi-sinusoidal profile.

Once the structure S has been determined by virtue of the definition of the first and second patterns, the recording method comprises an origination step, which consists in creating an original copy, also called an optical master. The optical master is for example an optical support on which the structure is formed. The optical master can be formed by electron or optical lithography procedures known from the prior art.

For example, according to a first embodiment, the optical master is produced by engraving an electro-sensitive resin using an electron beam. The relief can thus be obtained on the electro-sensitive resin by directly varying the flux of the electron beam on the zone that one wishes to impress. In this exemplary embodiment, the structure exhibiting the first pattern modulated by the second pattern can be engraved in a single step, according to a batch method.

According to another embodiment, an optical lithography (or photolithography) technique can be used. The optical master is in this example a photosensitive resin plate and the origination step is performed by one or more irradiations of the plate by projections of masks, of phase mask type and/or of amplitude mask type, followed by development in an appropriate chemical solution. For example, a first irradiation is carried out by projection of amplitude masks whose transmission coefficients are adapted so that, after development, a relief corresponding to the first pattern is formed. Thereafter, a second global irradiation is carried out using a second mask of phase mask type. According to procedures known to the person skilled in the art, the phase variations of this mask can be calculated beforehand so as to form, after development, a relief corresponding to the second pattern.

The order of formation of the patterns is arbitrary and can be modified. Subsequently, the development step is conducted. In this way, an optical master comprising a structure which results from the superposition of the first pattern and of the second pattern is obtained after development.

The optical master resulting from the superposition of the first and second patterns comprises after development a nano-relief so as to be able to produce the colored mirror effect whose color varies as a function of the direction of observation superposed on a microrelief which forms the sought-after convex or concave reflective element.

Finally, the step of metallic copying of the optical master can be undertaken, for example by galvanoplasty, as mentioned previously, so as to obtain the metal matrix or "master". According to an embodiment, a step of matricial duplication of the metal master can be performed to obtain a large-size production tool suitable for replicating the structure in industrial quantities.

Thereafter, as was described notably with reference to FIGS. 3A and 3B, the optical security components can be manufactured in large numbers by means of the matrices thus obtained.

FIGS. 6 to 9 illustrate particular examples of optical security components or of documents made secure by means of optical security components according to the present description as well as the visual effects implemented.

FIGS. 6 and 7 illustrate a first example in which, in a first region (referenced 61), the bas-relief comprises a set of facets whose shapes are determined so as to generate one or more concave cylindrical reflective elements 63 arranged according to a first line, and, in a second region (referenced 62), the bas-relief comprises a set of facets whose shapes are determined so as to generate one or more convex cylindrical reflective elements 64 arranged according to a second line parallel to the first line. In the figures, and so as not to complicate the drawings, the cylindrical reflective elements have been represented directly instead of the bas reliefs comprising each set of facets determined so as to form each of the cylindrical reflective elements.

In this example more particularly, the cylindrical reflective elements are symmetric and exhibit longitudinal axes $(\Delta_1, \Delta_2)$ parallel to the principal directions of the cylindrical elements, the longitudinal axes $\Delta_1$ of the concave elements 63 being parallel to one another and parallel to the longitudinal axes $\Delta_2$ of the convex elements 64, also parallel to one another.

Moreover in this example, in the first region 61, the first pattern is modulated with a first sub wavelength grating and in the region 62, the first pattern is modulated with a second sub wavelength grating in such a way that the first and second gratings are defined from the projections of two unidimensional plane gratings characterized respectively by first and second grating vectors of perpendicular directions, the direction of one of the grating vectors being parallel to one of the first and second principal directions. Thus in the figures, the first region 61 is represented with a first texture corresponding to a first color, for example "red", while the second region 62 is represented with a second texture corresponding to a second color, for example "green", the color depending of course on the choice of the spacing of the gratings.

For example, in the example of FIGS. 6 and 7, the elements 63 are cylindrical reflective elements exhibiting a total length of about 12 mm and a width of 2 mm. On the concave (region 61) and convex (region 62) reflective elements, the sub wavelength gratings are unidirectional and of perpendicular directions, with a spacing of about 380 μm, making it possible to generate in direct reflection at zero order respectively an intense red color and an intense green color on the two regions.

Figure 6A:
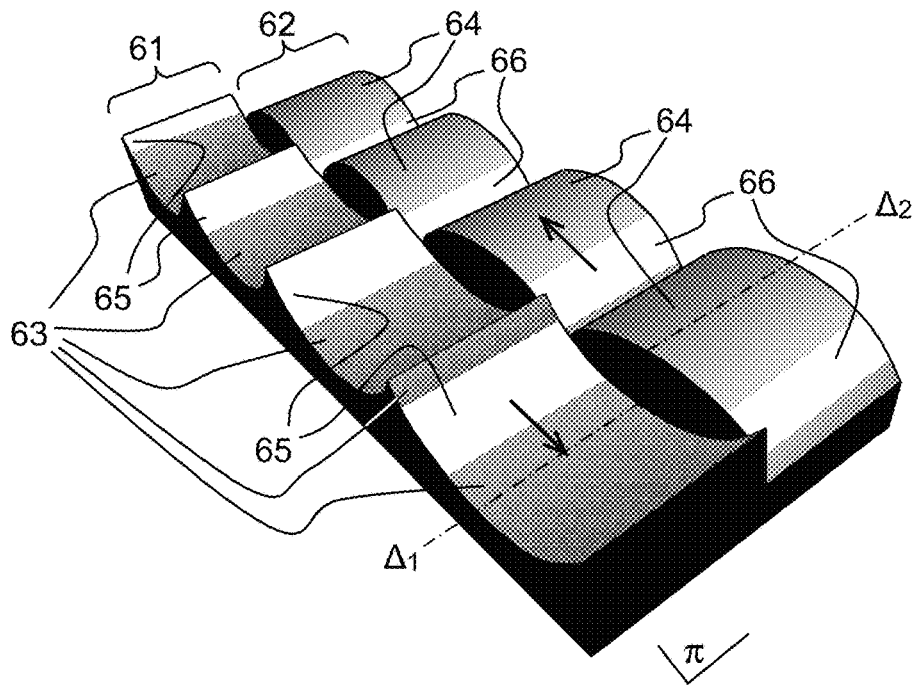
FIGS. 6A and 6B, diagrams simulating the visual effect (lateral view) obtained by means of an exemplary embodiment of a component according to the present description, according to two tiltwise observation angles.
Figure 6B:
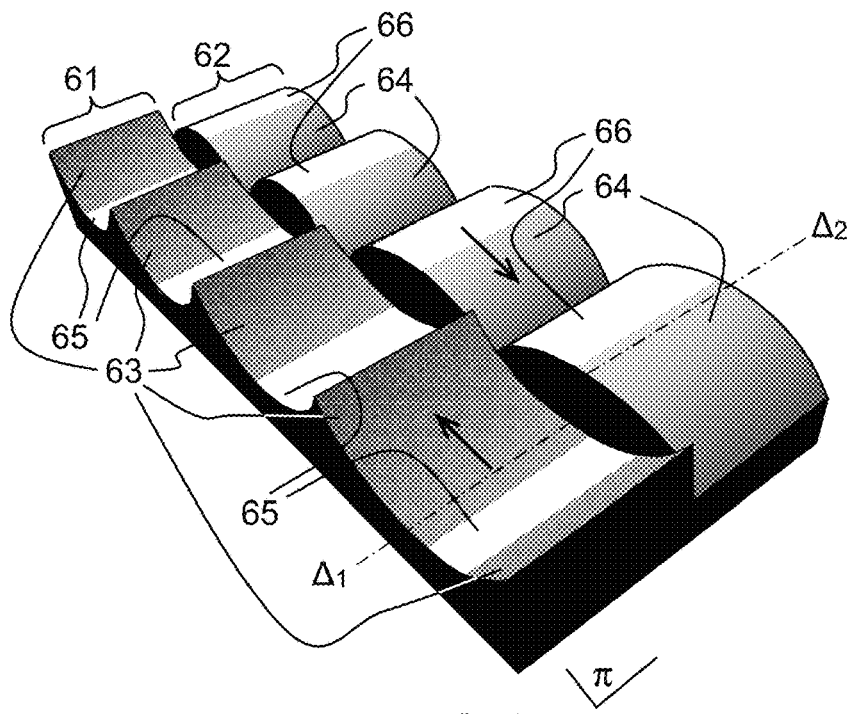
Figure 7A:
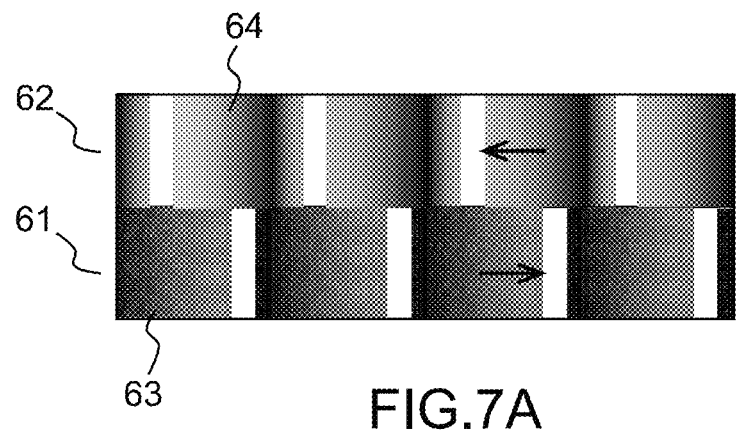
FIGS. 7A and 7B, diagrams simulating the visual effect (view from above) obtained by means of the same component as that of FIGS. 6A and 6B, according to two azimuthal observation angles.
Figure 7B:
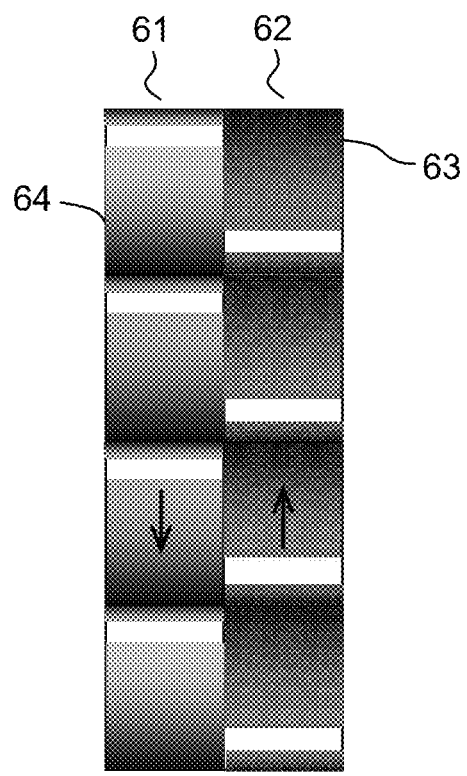

The visual effect is noteworthy here since when the component is made to undergo a tiltwise rotation, see for example the passage from FIG. 6A to FIG. 6B, one observes not only bright lines 65 (region 61) and 66 (region 62) move in opposite directions (represented by arrows) but this dynamic effect is coupled with the color visual effect since an observer will see that the "red descends" at the same time as the "green rises". Moreover, when the user causes the component to undergo an azimuthal rotation (between FIGS. 7A and 7B for example), he observes a reversal of colors between the two regions.

Figure 8A:
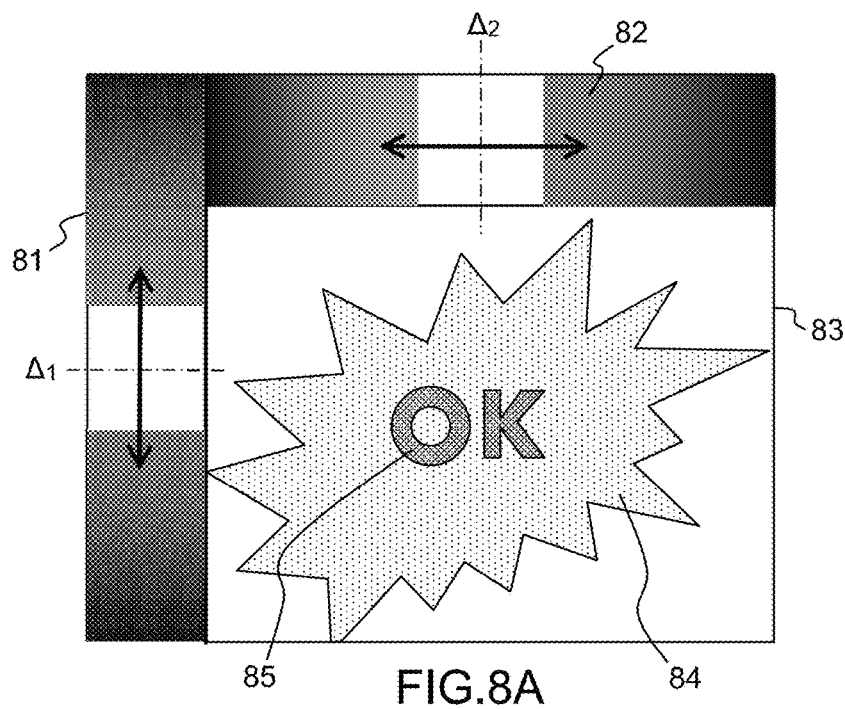
FIGS. 8A and 8B, diagrams simulating the visual effect (view from above) obtained by means of other examples of components according to the present description.
Figure 8B:
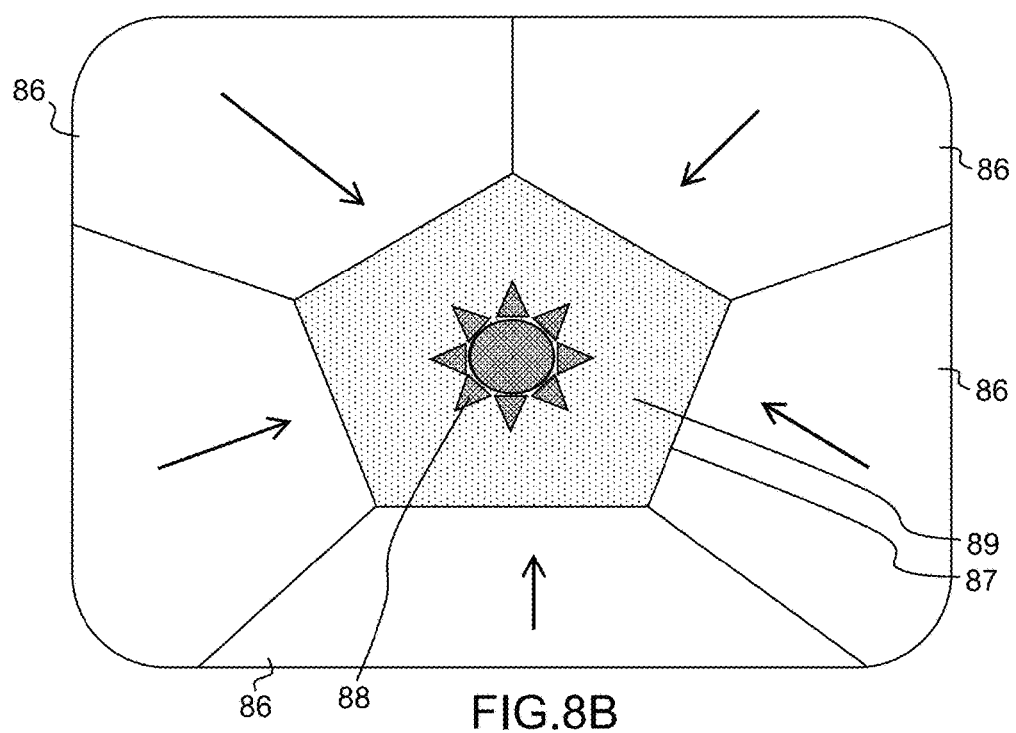

FIGS. 8A and 8B illustrate two other examples of optical security components according to the present description exhibiting noteworthy visual effects.

The optical security component represented in FIG. 8A comprises in a first region 81 a first set of facets forming a first concave or convex cylindrical reflective element exhibiting a first longitudinal axis ($\Delta_1$) indicated horizontal in FIG. 8A. Stated otherwise, as was explained previously, the facets of this first set of facets are formed of planes oriented in the first longitudinal direction ($\Delta_1$) and inclined with respect to the plane of the component in a continuously variable manner on either side of a first substantially plane central facet, delineated in FIG. 8A by a bright band. Moreover, the first set of facets is modulated with a first sub wavelength grating so as to form a wavelength-subtractive filter, in order to form a given color, for example "red".

The optical security component represented in FIG. 8A furthermore comprises in a second region 82 a second set of facets forming a second cylindrical reflective element, which may also be concave or convex, and exhibiting a second longitudinal axis ($\Delta_2$) which in this example lies perpendicular to the first longitudinal axis $\Delta_1$ (vertical in FIG. 8A). Thus, the facets of this second set of facets are formed of planes oriented in the second longitudinal direction ($\Delta_2$) and inclined with respect to the plane of the component in a continuously variable manner on either side of a second substantially plane central facet, delineated in FIG. 8A by a bright band. Moreover, the second set of facets is modulated with a second sub wavelength grating of identical spacing to the first sub wavelength grating but oriented in a perpendicular manner, so as to form a wavelength-subtractive filter centered on a complementary color, in this example "green".

In the example of FIG. 8A, the cylindrical reflective elements 81 and 82 bracket a central region 83 in such a way that each of the central facets are arranged opposite markers placed on the sides of the region 83, these markers corresponding for example to the middle of the sides. Advantageously, in the third region 83, the first pattern of the structure is formed of a plane surface and the second pattern forms one or more sub wavelength gratings (84, 85) acting, after deposition of the thin layer and encapsulation of the structure, as one or more wavelength-subtractive filters.

Thus, in the example of FIG. 8A, as the longitudinal axes of the cylindrical reflective elements are perpendicular, when a user moves the component tiltwise either in relation to the axis $\Delta_1$, or in relation to the axis $\Delta_2$, he is naturally directed to position the component in an equilibrium position corresponding to the positioning of the central facets facing the markers of the zone 83. In this position, it will be able to observe the central region 83 in direct reflection and with ease. Stated otherwise, when an observer has found the appropriate tiltwise angle of orientation of the component by referring to the positions of the "red" and "green" lines of the reflective elements 81 and 82, he is naturally and automatically well positioned in relation to the component in order to observe the DID structure on the third region. For example, as is visible in FIG. 8A, he will be able to see the green "OK" 85 standing out against a red background 84. Moreover, by rotating the component azimuthally, he will observe a reversal of the colors.

FIG. 8B shows another exemplary component according to the present description, implementing cylindrical reflective half-elements 86, that is to say cylindrical reflective elements formed of the parts of symmetric cylindrical reflective elements that are situated on one side of the longitudinal axis. In this example, 5 cylindrical reflective half-elements, advantageously concave, are arranged around a central region 87 which, as previously, comprises a first pattern formed of a plane surface modulated by two sub wavelength gratings 88 and 89 forming for example complementary patterns as in the example of FIG. 8A. The cylindrical reflective half-elements 86 exhibit central facets which meet at the level of the region 87. They are symbolized in FIG. 8B by arrows which aim toward the central region 87.

In this example again, a user will be directed naturally to orient the optical security component in such a way that the bright and colored bands of the cylindrical reflective half-elements 86 run in the direction of the arrows and meet at the level of the central region 87. In this position, the component will be perfectly oriented to reveal in reflection, at zero order, the DID structures 88 and 89.

Figure 9:
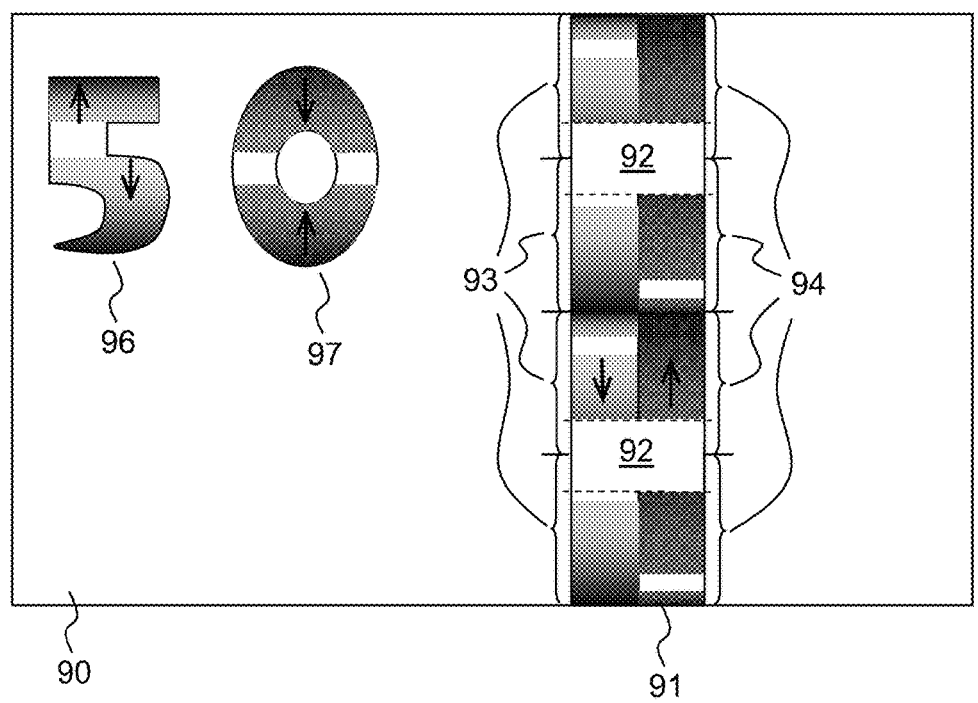
FIG. 9, an exemplary banknote on which are incorporated various components according to the present description.

FIG. 9 represents an example of a banknote 90 secured by means of optical security components according to the present description.

For example, the banknote comprises two digits "5" and "0" formed respectively by two cylindrical reflective elements exhibiting parallel principal directions and on which are formed sub wavelength gratings such that the "5" appears in a first color while the "0" appears in a second complementary color, the colors reversing through 90° azimuthal rotation of the banknote. Here again, a tiltwise rotation of the banknote about the principal direction, displaces a bright band of a color on the first digit and a bright band of another color on the second digit. The cylindrical reflective elements may both be concave, both convex or one concave and one convex. The shape of the digits is advantageously obtained during transfer by hot pressing onto the banknote with a suitably shaped marking tool.

On this same banknote is also represented a security thread 91 comprising two lines, for example those represented in FIGS. 6A and 6B, of parallel cylindrical reflective elements. During insertion of the security thread into the paper pulp, the thread is partially buried in or under the paper, thereby resulting in zones 92 in which the effect is no longer visible.

Figure 10:
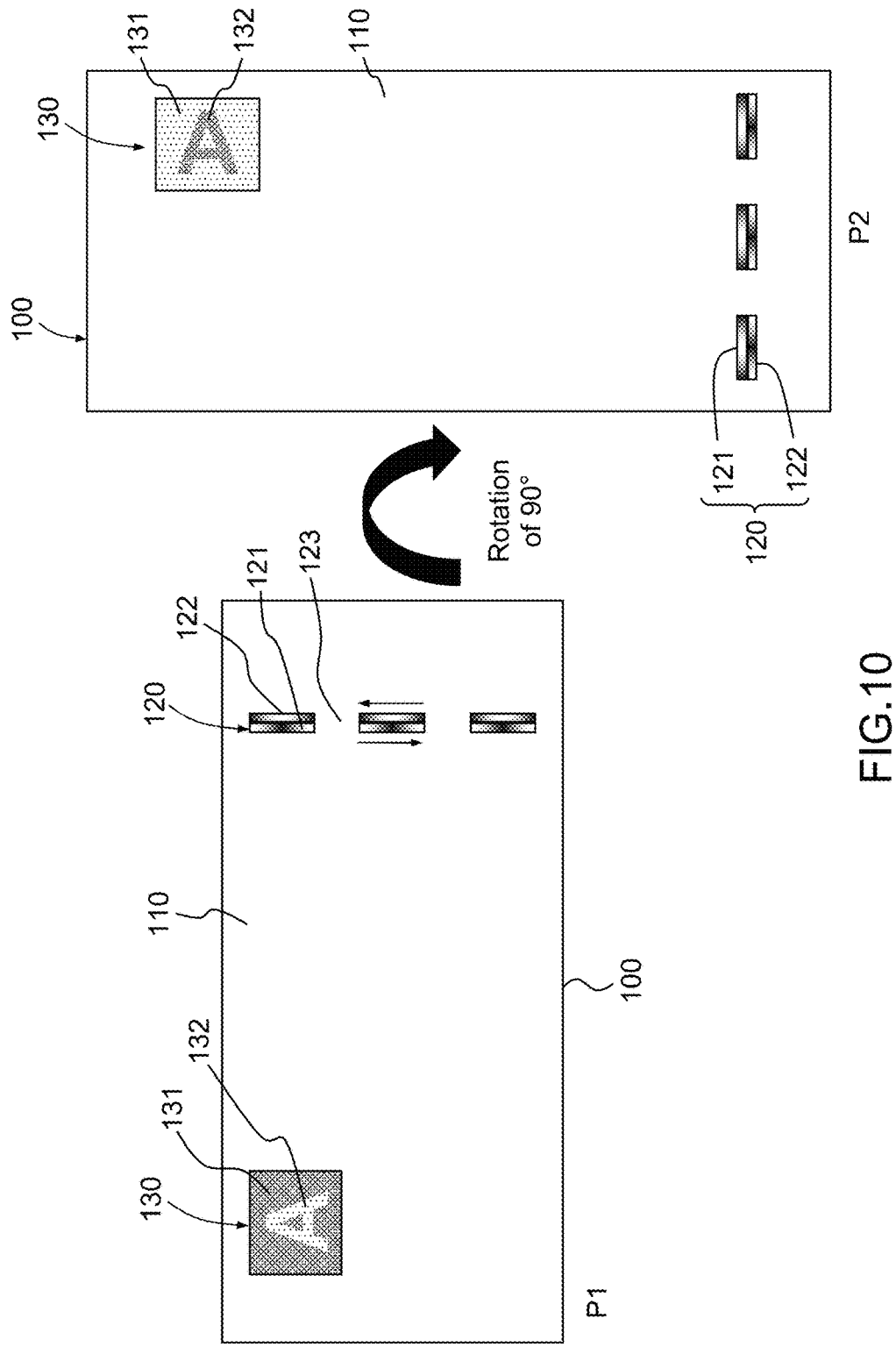
FIG. 10, an exemplary banknote incorporating a component of the present description in the form of a thread and a component offering an effect different from that of the present invention in the form of a patch.

In an example represented in FIG. 10, a banknote 100 comprises a first optical security component 120 and a second optical security component 130.

The first optical security component 120 is a component according to the present description. It takes the form of a security thread of the type of that described in the example of FIG. 9. The security thread 120 comprises two lines, such as those for example represented in FIGS. 6A and 6B, of parallel cylindrical reflective elements 121 and 122. The security thread 120 is inserted partially into the paper 110 of the banknote, during the manufacture of said paper. More precisely, the security thread 120 is inserted into the paper pulp during the manufacture of the banknote paper so that said thread 120 is partially buried in or under the paper forming the banknote support. The security thread 120 is therefore partially visible on a front face of the banknote 100, this same front face of the banknote 100 also comprising zones 123 where the thread is not visible.

As explained previously, the first optical security component 120 exhibits a dynamic visual effect in which an observer sees bright lines move in opposite directions (represented by arrows). This dynamic visual effect is coupled with a color visual effect in which the observer sees a first color, for example red, "descend" and at the same time a second color, for example green, "rise".

In the example of FIG. 10, the second optical security component 130 exhibits a visual effect different from the dynamic visual effect exhibited by the first optical security component 120 but correlated with the color visual effect of said first component.

The visual effect of the second optical security component 130 can be a color effect obtained via the structure's first pattern formed of a plane surface and its second pattern forming one or more sub wavelength gratings acting, after deposition of the thin layer and encapsulation of the structure, as one or more wavelength-subtractive filters. An observer observing the second optical security component 130 will see a colored effect of a first color, for example "green" and, under the effect of an azimuthal rotation of substantially 90° (that is to say a rotation in one and the same plane), the observer will see a colored effect of a second color, for example "red".

When the banknote 100 is in a position P1, the zone 132, for example the letter A, may appear in the first color, for example green, and the surrounding zone 131 in the second color, for example red. After an azimuthal rotation of 90°, when the banknote is in the position P2, the letter A 132 will appear in red and the surrounding zone 131 will appear in green.

Likewise, the line 121 of the thread 120 may appear in one color, for example red, and the line 122 in another color, for example green, when the banknote is in the position P1. After an azimuthal rotation of 90°, an observer will see a "reversal" of the colors, that is to say that the line 121 will appear green and the line 122 will appear red.

Thus, the color visual effect of the second optical security component 130 is correlated via the colors, for example red and green, with the color visual effect of the first optical security component 120. Indeed, on condition that the first and second sub wavelength gratings are identical or quasi-identical for the second optical security component 130 and the first optical security component 120, then an observer will see an agreement in the colors between the visual effects of the first optical security component 120 and the visual effect of the second optical security component 130.

In another example of FIG. 10, the visual effect of the second optical security component 130 may be a color visual effect such as described hereinabove, associated with a relief effect generated by a structure comprising a bas relief modulated by a one- or two-dimensional periodic grating such as that described in patent FR 2 959 830.

In an embodiment of this example, when the banknote 100 is in the position P1, the letter A of the zone 132 may appear in one color, for example green, and in relief with respect to the surrounding zone 131 which appears in another color, for example red, and without relief. After an azimuthal rotation of 90°, when the banknote is in the position P2, the zone 132 will appear in relief and in red to the observer and the surrounding zone 131 will appear in green, without relief. On the contrary, in the position P1, the surrounding zone 131 may appear in relief in one color, for example red, and the zone 132 appears without relief in another color, for example green. In this case, after an azimuthal rotation of 90°, when the banknote is in the position P2, the surrounding zone 131 will appear in relief and in green to the observer and the zone 132 will appear in red, without relief.

In another embodiment of this example, when the banknote 100 is in the position P1, the letter A of the zone 132 may appear in one color, for example green, and with a first relief with respect to the surrounding zone 131 which appears in another color, for example red, and with a second relief, different from the first relief. After an azimuthal rotation of 90°, when the banknote is in the position P2, the zone 132 will appear to the observer with the first in relief and in red and the surrounding zone 131 will appear in green, with the second relief.

The color visual effect of the second optical security component 130 is therefore correlated, via the colors for example red and green, with the color visual effect of the first optical security component 120. The first optical security component 120 and the second optical security component therefore have a common visual effect, namely identical colors which reverse simultaneously during azimuthal rotation of the banknote, and a different visual effect resulting from the dynamic effect of the first optical security component.

The banknote 100 shown in FIG. 10 can be manufactured in the following manner: the first optical security component 120 is firstly manufactured in the manner described above. It is thereafter incorporated into the paper pulp intended to form the banknote support. Once the banknote support has been formed, the second optical security component 130 is fitted in place on the front face of said support, for example by heating a hot-reactivatable adhesive layer contained in said second optical security component.

According to this method, the security elements of the banknote (the first and the second optical security components) are fitted in place in the banknote in different steps of the manufacture of said banknote and at different sites: the first optical security component 120 is inserted at the premises of the manufacturer of the banknote support, for example the paper manufacturer, while the second optical security component 130 is fixed at the premises of the printer of the banknote, thereby enabling the banknote manufacturing method to be made secure.

Although described through a certain number of exemplary embodiments, the optical security component according to the invention and the method for manufacturing said component comprise diverse embodiments, modifications and enhancements which will appear in an obvious manner to the person skilled in the art, it being understood that these diverse embodiments, modifications and enhancements form part of the scope of the invention as defined by the claims which follow.

The invention claimed is:

1. An optical security component intended to be observed according to an observation face in a spectral band lying between 380 and 780 nm and in direct reflection, comprising:
   a structure engraved on a layer of a material exhibiting a refractive index $n_2$,
   a thin layer of a dielectric material exhibiting a refractive index $n_1$ different from $n_2$, deposited on the structure;
   a layer of a material of refractive index $n_0$ different from $n_1$ encapsulating the structure overlaid with the thin layer, the structure exhibiting a first pattern modulated by a second pattern in such a way that:

in at least one first region, the first pattern comprises a bas-relief with a first set of facets whose shapes are determined so as to generate one or more cylindrical reflective elements concave seen from the observation face, arranged according to a first line, exhibiting a first principal direction, and the second pattern forms a first sub wavelength grating acting, after deposition of the thin layer and encapsulation of the structure, as a first wavelength-subtractive filter, exhibiting a first color;

in at least one second region, the first pattern comprises a bas-relief with a second set of facets whose shapes are determined so as to generate one or more cylindrical reflective elements convex seen from the observation face, exhibiting a second principal direction, and the second pattern forms a second sub wavelength grating acting, after deposition of the thin layer and encapsulation of the structure, as a second wavelength-subtractive filter, different from the first wavelength-subtractive filter, exhibiting a second color different from the first color, wherein the first and second sub wavelength gratings are defined from the projections on each of the first and second sets of facets of two, unidimensional, plane gratings arranged in a plane parallel to the plane of the component and exhibiting respectively first and second grating vectors of perpendicular directions, the direction of one of the grating vectors being parallel to said first and second principal directions.

2. The optical security component as claimed in claim 1, in which the norm of the grating vector whose direction is parallel to one of the first or second principal directions is variable in such a way that the grating projected on the corresponding set of the facets is of substantially constant spacing.

3. The optical security component as claimed in claim 1, in which the first and second sets of facets form sets of plane surfaces, oriented along respectively the first and second principal directions, and inclined with respect to the plane of the component in a continuously variable manner to respectively first and second substantially plane central facets.

4. The optical security component as claimed in claim 3, in which the width of the central facet of a set of facets, measured in a direction perpendicular to the principal direction, is at least equal to 5% of the length of the corresponding reflective element, measured in the same direction.

5. The optical security component as claimed in claim 3, in which at least one of the first and second sets of facets exhibits a longitudinal axis, parallel to the principal direction of the corresponding reflective element, and centered on the central facet.

6. The optical security component as claimed in claim 3, in which at least one of the first and second central facets forms an end of the corresponding set of facets.

7. The optical security component as claimed in claim 3, in which, in a third region situated in proximity to the central facets of the first and second sets of facets, the first pattern of the structure is formed of a plane surface parallel to the first and second central facets and the second pattern forms one or more sub wavelength gratings acting, after deposition of the thin layer and encapsulation of the structure, as one or more wavelength-subtractive filters.

8. The optical security component as claimed in claim 1, suitable for securing a document or a product, and comprising on the face opposite to the observation face a layer for the transfer of the component onto the document or the product.

9. The optical security component as claimed in claim 8, furthermore comprising, on the observation face side, a support film intended to be detached after transfer of the component onto the document or the product.

10. The optical security component as claimed in claim 8, furthermore comprising on the side opposite to the observation face, a colored contrast layer.

11. The optical security component as claimed in claim 1, suitable for the manufacture of a security thread for securing banknotes, and comprising on the observation face side and on the face opposite to the observation face, protection layers.

12. A banknote comprising at least one first optical security component as claimed in claim 11, said first optical security component forming a security thread partially inserted into a support of the banknote.

13. The banknote as claimed in claim 12, furthermore comprising a second optical security component positioned on a face of the banknote and forming two wavelength-subtractive filters similar to the first and second wavelength-subtractive filters of the first optical security component.

14. A method for manufacturing an optical security component intended to be observed in a spectral band lying between 380 and 780 nm and in direct reflection, the method comprising:

the deposition on a support film of a first layer of a material of refractive index $n_0$;

the formation on the first layer of at least one engraved structure, the structure exhibiting a first pattern modulated by a second pattern in such a way that:

in at least one first region, the first pattern comprises a bas-relief with a first set of facets whose shapes are determined so as to generate one or more cylindrical reflective elements concave seen from the observation face, arranged according to a first line, exhibiting a first principal direction, and the second pattern forms a first sub wavelength grating acting, after deposition of the thin layer and encapsulation of the structure, as a first wavelength-subtractive filter, exhibiting a first color;

in at least one second region, the first pattern comprises a bas-relief with a second set of facets whose shapes are determined so as to generate one or more cylindrical reflective elements convex seen from the observation face, exhibiting a second principal direction, and the second pattern forms a second sub wavelength grating acting, after deposition of the thin layer and encapsulation of the structure, as a second wavelength-subtractive filter, different from the first wavelength-subtractive filter, exhibiting a second color different from the first color, wherein the first and second sub wavelength gratings are defined from the projections on each of the first and second sets of facets of two, unidimensional, plane gratings arranged in a plane parallel to the plane of the component and exhibiting respectively first and second grating vectors of perpendicular directions, the direction of one of the grating vectors being parallel to said first and second principal directions;

the method furthermore comprising:

the deposition on the engraved structure of a thin layer of a dielectric material exhibiting a refractive index $n_1$ different from $n_0$;

the encapsulation of the structure overlaid with the thin layer by a layer of a material exhibiting a refractive index $n_2$ different from $n_1$.

15. The method for manufacturing a banknote as claimed in claim 13 comprising:

the manufacture of a first optical security component as claimed in claim 14, the incorporation of the first optical security component into a support of the banknote, and the fitting in place of the second optical security component on a face of said support.

* * * * *